Patented Oct. 15, 1940

2,217,919

UNITED STATES PATENT OFFICE 2,217,919

UNSATURATED HYDROCARBON COMPOSITIONS

Fritz Rostler, Wilmington, Del., and Vilma Mehner, Vienna, Germany

No Drawing. Application May 25, 1939, Serial No. 275,726. In Austria May 4, 1932

2 Claims. (Cl. 196—149)

This invention relates to unsaturated hydrocarbon compositions; and it comprises, as new and useful materials, the oily or resinous hydrocarbon products obtained by thermolytic conversion of over-neutralized acid sludge, and otherwise as described hereinbelow, said products being high-boiling viscous liquids or resinous solids at ordinary temperatures, having a reddish brown color with green fluorescence, being soluble in acetone, aniline and concentrated sulfuric acid, and being vulcanizable and readily prepared in a condition free of rubber poisons; all as more fully hereinafter set forth and as claimed.

The treatment of petroleum oils, including fractions thereof, with sulfuric acid, results in the formation of reaction products which remain associated with the unconsumed acid as a viscous liquid or semi-solid material. This material is known variously in this country as petroleum acid sludge, refinery acid sludge, sulfuric acid sludge, or acid sludge; and abroad, it is generally designated "acid tar." The present invention relates to a particular type of hydrocarbon products, soluble in concentrated sulfuric acid and having other distinguishing characteristics, and obtainable from these acid tars or acid sludges. This application is a continuation-in-part of our copending applications Ser. No. 751,891, filed November 7, 1934, Ser. No. 138,666, filed April 23, 1937, and Ser. No. 220,584, filed July 21, 1938.

In refining mineral oils with sulfuric acid, the acid withdraws from the oil unsaturated organic compounds of various types, including resins and olefins, which are not desired in the purified oils. The petroleum oil is stirred with the acid as long as may be desired, and the acid sludge is then settled out and withdrawn. This sludge is a darkcolored, evil-smelling, tarry product, and is generally highly viscous, especially when heavy oils are refined.

Various processes are known to the prior art for the recovery of sulfuric acid from this acid sludge; the sulfuric acid being recovered as such, or in the form of sulfur dioxide, etc. Processes are also known for the recovery of the neutral oil or saturated hydrocarbons which are retained in the tar, this being generally effected by diluting the sludge to form "sludge acid" and to cause separation of the neutral oils. Processes have also been disclosed heretofore for recovery of the organic matter contained in the acid tar in the form of asphalts and the like. In these known prior processes, it was often considered preferable to treat mixtures of acid tars, or acid tars and sludges in admixture with other byproducts.

It is our discovery that a new type of oily unsaturated hydrocarbons having distinctive properties can be obtained by suitable treatment of these acid sludges and similar residues of mineral oil refining. These new products may be obtained from substantially any of the acid tars or sludges obtained by refining mineral oils and their fractions with sulfuric acid; and it is immaterial whether the sludge is produced in refining paraffinic or naphthenic mineral oil products. Regardless of the source, we always obtain unsaturated hydrocarbons which are soluble in concentrated sulfuric acid and have high molecular weight and high viscosity. In some respects, these new products resemble oily resins or resinous oils.

While acid sludges are obtained in the refining of both cracked and uncracked petroleum products, it is known that these sludges and their constituents differ somewhat in composition and properties. In our invention, the acid sludges produced in refining natural oils, or fractions obtained in the low pressure distillation thereof, are most desirable. In other words, acid sludges obtained in refining uncracked petroleum oils and products are most suitable for our purposes. The sludges formed in refining cracked petroleum products, and especially cracked gasoline and other light products, are not so well suited for treatment to recover the product of this invention, and yield different and less desirable products.

Our new hydrocarbon products are best obtained when utilizing acid tars or sludges which have been previously freed from neutral oil, as by centrifuging, etc. When neutral oils are present in the sludge, they go forward with the distillate produced in accordance with our invention, and the distillate is admixed or diluted with neutral or saturated hydrocarbons to that extent. We find it more advantageous to use as a raw material an acid sludge which has been previously freed from neutral oil.

We have found that the tarry constituents of the sludge consist mainly of addition products of sulfuric acid and the unsaturated organic compounds present, and we have also found that oily hydrocarbons which are soluble in sulfuric acid, and which have the other distinctive properties mentioned herein, may be recovered from these tarry constituents of the sludge by gentle treatment. It is a necessary part of the treatment to split off the combined sulfuric acid, and to eliminate it from the product along with substances having an undesired polymerizing effect, such as free acid or metallic halides such as aluminum chloride.

This may be accomplished by adding to the sludge more than enough neutralizing material to combine all the acid present in free form and in combination with organic compounds, and then gently heating the mixture to cause thermolytic conversion into an organic portion comprising our new hydrocarbon product and an inorganic portion containing the inorganic constituents of the mixture. The hydrocarbon or organic portion may be separated from the mixture as fast as it is formed, as by distillation under suitable conditions described hereinbelow; or it may be separated after conversion is complete, as by extraction and fractionation of the extract. In all cases, the sulfuric acid and other inorganic constituents of the acid sludge are separated from the hydrocarbon product and left in the residue of distillation or extraction, along with the excess neutralizing agent; and this residue obtained in our process contains such a small proportion of organic material that it is not suitable for use as fuel. The organic constituents of the acid tar are, however, substantially completely converted into the new unsaturated hydrocarbon product. In other words, this process converts acid sludge into an organic product consisting largely of our new unsaturated hydrocarbons and into a non-volatile, inorganic residue.

Similar results are obtained when the neutralization and conversion take place in the liquid phase, as described and claimed in our copending application Serial No. 149,183. In this modification of our process, a liquid, which may be aqueous or organic, is added to the mixture of acid sludge and neutralizing agent in sufficient quantity to maintain the system in a fluid condition. This facilitates reaction and heat transfer, making it unnecessary to use large excesses of neutralizing agent and avoiding local over-heating. It also facilitates separation of the organic and inorganic reaction products. But the separated organic product is substantially the same as in the dry process. A similar and often identical product is also obtainable when using as the starting material the residue of the solvent extract method of refining suitable petroleum products. This is described in our application Serial No. 224,626. The details of the procedure involved in obtaining the unsaturated hydrocarbon product from solvent extract differ somewhat from those involved when starting with acid sludge. As stated, however, the products are similar. In fact, it is often desirable to start with mixtures of acid sludge and solvent extract, as described in the aforesaid application.

It is thus an object achieved by our invention to provide new unsaturated hydrocarbon products having many applications in the arts and industries, these products being obtainable, and most often obtained, from waste products of mineral oil refining. As an example of one method of obtaining our new hydrocarbon products, the dry process and some of its modifications will now be described in more detail, with acid sludge as the starting material. In this process, we mix with the acid sludge a quantity of neutralizing agent which is sufficient to bind not only any free acid present, but also any acid which may be released by its organic associates during the thermal treatment. There is thus no undesired polymerizing action during distillation, or during any other step of the process; or, if polymerization occurs, it does not result in undesirable saturated compounds. As a rule, we determine analytically the total sulfur content of the acid sludge to be treated, and we then employ more neutralizing agent than corresponds to the total sulfur calculated as $SO_3$. This excess of neutralizing agent serves under all conditions to bind any acid which might otherwise be released during any stage of the formation and recovery of the new products, and thus prevents polymerization to saturated compounds and other undesired actions. It is essential to have an excess of neutralizing agent present and available during any heating of the unseparated reaction mixture.

We may use as neutralizing agents metal oxides or hydroxides or suitable salts such as carbonates, and we may also use metals which are readily attacked by the acid which is present or liberated in the mixture. When using metals, gases are developed which have the advantageous effect of loosening up the mixture, while the metal present improves heat transfer. Metallic wastes, such as turnings or metal chips, are suitable neutralizing agents. The loosening effect is, of course, also obtained when using as neutralizing agents carbonates, etc., which also evolve gases. Whatever neutralizing agent may be employed, it is essential that it be employed in excess.

We have found that certain compounds catalyze the reaction between the acid sludge and the neutralizing agent and shorten the time required for its completion. These catalytic agents also improve the yield and the quality of the organic reaction product (the new hydrocarbons) obtained. Catalysts which we have found to have this effect are heavy metal salts such as copper sulfate and iron sulfate. These catalysts may be added to the neutralizing agent or to the mixture of neutralizing agent and acid sludge. When using slaked lime as the neutralizing agent, the catalyst may conveniently be incorporated therein by slaking with a copper sulfate solution. Some commercial products contain sufficient iron or copper compounds as impurities to make the use of additional catalysts unnecessary. This is often true of dolomite, for example, which is a suitable neutralizing agent for our process.

The reaction mixture obtained by combining the acid sludge and excess neutralizing agent is substantially solid at ordinary temperatures and may be comminuted, if desired, prior to distillation. Dry distillation is then effected, generally in a vacuum, as this makes possible the use of lower temperatures. In any case, it is best to so operate that the highest temperature of the hydrocarbons, even at the end of the distillation, does not exceed 380° C. It may sometimes be permissible to end at a temperature as high as 410° C., but it is better to remain below 400° C., and we regard it as best to maintain the hydrocarbons at temperatures below 360° C. at all stages of the treatment. In practice, it is often permissible to operate at even lower temperatures, as shown by the examples hereinbelow. The use of temperatures below about 400° C. prevents cracking and decomposition or other undesired effects on the unsaturated hydrocarbons which are desired in the product.

One method of separating the desired hydrocarbon products from the reaction mixture by distillation at these low temperatures, is to operate under a rather high vacuum. When so operating, the pressure during distillation should not exceed 100 mm. mercury, and, in practice, is often as low as 12 to 40 mm. or less. This effects a low partial pressure of the oil (hydrocarbon) vapors at the point of evolution. When relying on vacuum to effect this low partial pressure, it is necessary to employ greatly reduced pressure in the still, and it is difficult or impossible to obtain our unsaturated hydrocarbons if the pressure during distillation exceeds 100 mm. mercury. At higher pressures, in this method of operating, the unsaturated hydrocarbons constituting our new product are not separated as such from the mixture, or are partially consumed (oxidized) by the sulfuric acid constituents present, or are otherwise changed into undesirable products, in whole or in part.

It is often advantageous, when operating under high vacuum, to apply the vacuum for a time at a certain temperature—say 200° C.—and then to shut off the vacuum while rapidly raising the temperature to 250° C., for example. This stepwise operation may be repeated as often as desired, and effects considerable saving of time as compared with operating entirely under vacuum.

The vacuum distillation may be effected while passing through the still a current of an inert gas, such as superheated steam. A slight flow of inert gas during the dry vacuum distillation shortens the time required for complete recovery of the hydrocarbon distillate, and has the further advantage that it permits treatment under even more gentle conditions than the vacuum alone.

In a modified method of operation, the essential low partial pressure of the oil vapors at the point of evolution is insured by the circulation of a substantial current of inert gas through the still. This is effective in obtaining the desired products when no vacuum is applied, or when there is a slight vacuum not sufficient in itself to enable operation at the desired low temperatures. For example, the dry reaction mixture may be fed through a tubular chamber equipped with a helical conveyor. The chamber and the reaction product therein are heated to a temperature of the order of, but not exceeding, 350° to 400° C., and a current of nitrogen or other inert gas is passed through the chamber, advantageously countercurrent to the movement of the reaction material. This produces in the chamber an atmosphere consisting predominantly of the inert gas, and reduces the partial pressure of the evolved hydrocarbon vapors. The vapors are carried out of the chamber with the gaseous current and readily condensed therefrom by cooling in known manner. Advantageously, the gas partially or completely stripped of oil vapors is then reheated, as by a heat exchanger and auxiliary heater, and returned to the chamber. Recirculation is desirable as it minimizes loss of heat, as well as loss of the product, from the system. In this method of operation, as well as when operating at a high vacuum, the new hydrocarbon product may be obtained at sufficiently low temperature to insure the desired characteristics.

The methods of operation described hereinabove include treatment of acid sludge from the sulfuric acid refining of mineral oil with an excess of neutralizing agent, with or without the presence of neutral oil, followed by dry distillation of the organic reaction product at relatively low temperatures and conditions of low partial pressure. In a modification of these methods, the mixture of acid sludge and the excess of neutralizing agent is treated with a suitable organic solvent for the hydrocarbon compounds, advantageously after heating sufficiently to effect thermolytic conversion into the desired hydrocarbon product and the substantially inorganic residue. Suitable solvents include ether, acetone and other ketones, liquid hydrocarbons and chlorinated hydrocarbons. These solvents extract the desired oily or resinous unsaturated hydrocarbons from the reaction mixture, and the extract thus obtained is subjected to distillation. Advantageously, this distillation of the extract is effected under reduced pressure, with a fractionation of the distillate to recover the solvent for re-use. This vacuum distillation of the extracts may be accompanied by a feed of an inert gas, as previously described, and neutralizing agents should be present throughout the distillation. Extraction effects a pre-purification of the product, and the hydrocarbons recovered by this treatment are more pure than those obtained without extraction. Extraction also facilitates distillation of the product. When an end product of extremely high purity is required, the product of the original distillation of either the extract or the reaction mixtures may be redistilled.

The hydrocarbon products constituting the invention claimed in this application, and obtained as described hereinabove or otherwise, have a composition of approximately 90 per cent carbon and 10 per cent hydrogen, as shown by numerous analyses. This corresponds to the general formula $(C_3H_4)_n$. The molecular weight of these products varies from about 300 to 1000, and usually averages approximately 600. They have a reddish brown color and a green opalescence or fluorescence, and may be oils of high viscosity or resin-like substances at ordinary temperatures. Their specific gravities are high, being, as a rule, greater than one. Their boiling points are much higher than those of the petroleum distillates from which the acid sludge was obtained; as a rule, they distill over at temperatures between 160 and 380° C. at a pressure of 12 mm. mercury. Their viscosities at ordinary temperatures are often 100 to 200 times as high as those of the refined mineral oil products from which they are obtained. Their iodine numbers are low; sometimes below 20 and generally below 60.

These new hydrocarbon products are still further distinguished from other hydrocarbons of mineral origin by their reactions with various reagents. They react but slightly, if at all, with dilute aqueous reagents, but they are extremely reactive with several concentrated reagents. They can be nitrated smoothly, forming derivatives on treatment with strong nitric acid; and on treatment with strong sulfuric acid they are converted into addition products with considerable evolution of heat. In contrast with ordinary petroleum hydrocarbons, they are completely soluble in acetone and aniline, as well as concentrated sulfuric acid. Hydrogenation under conditions usually suitable for mineral oils is so difficult as to be impractical. They have a great affinity for sulfur, however, and, when heated with small quantities of sulfur, they form more highly viscous derivatives or polymerization products. It thus appears that they are closely allied to rubber, $(C_5H_8)_x$; and, like rubber, they are "vulcanizable."

We have thus obtained a new and definite type of unsaturated hydrocarbons, having distinctive reactivities, from the acid sludges produced in refining mineral oil products with sulfuric acid. Our new hydrocarbon product is entirely distinct from products obtained in prior processes of treating acid sludge or acid tar. These prior products were either mixtures of previously known hydrocarbons, such as benzines and lubricating oils, or products such as asphalts, having no definite composition. Furthermore, while the prior products varied greatly in accordance with the starting material, the characteristics of our new product are substantially independent of the starting material.

The peculiar properties of our new oils and their availability in large quantities make them useful in numerous branches of the chemical industry. For example, they may be used as slowly resinifying oils for impregnation; and they, or their nitric acid derivatives, may be used in the production of lacquers and varnishes. They also find many applications in the rubber industry, where they are useful as filling or spreading materials, in "devulcanization" and regeneration, and for other purposes described in detail in our copending applications Serial No. 166,392 (now Patent No. 2,180,367) and Serial No. 263,810, filed March 3, 1939.

When the acid sludge used as a starting material in our process is obtained by refining solid paraffin with sulfuric acid, the product of our distillation generally contains saturated hydrocarbons (paraffins) which are insoluble in sulfuric acid, along with the desired unsaturated hydrocarbons which are soluble in sulfuric acid. Our unsaturated hydrocarbon product may then be separated from the paraffin by treatment with a suitable selective solvent, such as acetone or ether-alcohol, or otherwise.

Various methods of obtaining our new product are illustrated in the following examples:

*Example I.*—A mixture of 30 parts of acid sludge, obtained in refining lubricating oil with sulfuric acid, and 20 parts of pulverized chalk, was subjected to distillation in vacuo. There resulted a reddish brown fluorescent oil in a yield of 27 per cent on the acid sludge. Most of the distillate was obtained between 270° and 290° C. under a pressure of 12 mm. mercury. It was completely soluble in concentrated sulfuric acid.

*Example II.*—38 parts of acid tar obtained in refining a light lubricating oil were mixed with 40 parts chalk, and the mixture was distilled in vacuo. The distillation produced a highly viscous oil, most of which came over between 250° and 270° C. at a pressure of 12 mm. mercury. The yield was 34 per cent on the acid sludge, and the product was soluble in sulfuric acid.

*Example III.*—50 parts of acid sludge from paraffin refining were mixed with 30 parts chalk and distilled in vacuo. There was obtained a light yellow paraffin-like mass. This was extracted with acetone to recover hydrocarbons soluble in sulfuric acid, amounting to 5 per cent on the acid sludge. Paraffin was also recovered in a yield of 30 per cent on the sludge.

*Example IV.*—100 parts of centrifuged acid sludge obtained in the refining of automobile oil were mixed with 60 parts magnesite. The mixture was pulverized and distilled in vacuo. The distillate boiled between 175° and 320° C. at a pressure of 40 mm. mercury. The yield of hydrocarbons soluble in sulfuric acid amounted to 40 per cent on the acid tar.

*Example V.*—100 parts of an acid resin obtained by refining petroleum with sulfuric acid and drawn from an acid tar pit where it had been stored for three years were mixed with 55 parts pulverized slaked lime. The mixture was distilled in vacuo in a current of superheated steam. Hydrocarbons soluble in sulfuric acid were obtained in a yield of 60 per cent on the acid tar.

*Example VI.*—10 parts of acid sludge obtained in the refining of lubricating oil were mixed with 4 parts oxidized copper chips and distilled in vacuo. The yield of hydrocarbons soluble in sulfuric acid was 28 per cent on the acid sludge.

*Example VII.*—100 parts of acid sludge, obtained by refining lubricating oil in a process employing de Laval separators, were reacted with 60 parts iron chips and distilled in vacuo. The distillate was obtained at temperatures between 185° and 340° C. at a pressure of 60 mm. mercury. Hydrocarbons soluble in sulfuric acid were obtained in a yield of 40 per cent on the acid tar.

*Example VIII.*—100 parts of acid tar, obtained in refining lubricating oil, were mixed with 80 parts of slaked lime containing copper, added by the use of copper sulfate solution in slaking. The reaction mixture was subjected to dry distillation in vacuo, and resulted in 60 parts of very viscous oil soluble in sulfuric acid and traces of paraffin.

*Example IX.*—100 parts of acid sludge from paraffin refining were heated with 60 parts of lime, and the product obtained was mixed with cuttings of brass wire gauze and distilled in vacuo. The yield was 35 parts paraffin and 10 parts of oil soluble in sulfuric acid.

*Example X.*—100 parts of acid sludge derived from refining lubricating oil were mixed with 60 parts lime. The dry mixture was charged into an inclined tubular chamber provided with a helical conveyor through which a countercurrent of nitrogen was recirculated. The chamber was maintained at a temperature of 350° to 390° C. Gas and vapors discharged from the chamber were cooled to a temperature of 120° C., condensing the hydrocarbon product from the gas stream before returning the nitrogen to the chamber. The yield was 42 per cent, calculated on the acid sludge, of oil soluble in sulfuric acid.

*Example XI.*—100 parts of acid resin derived from lubricating oil refining were mixed with 30 parts of calcium oxide and 100 parts of water, heated to boiling, and after conclusion of the reaction, heated for 2 hours at 6 atm. in an autoclave in the presence of 0.5 part of $FeSO_4$; after removal of the aqueous layer, the organic reaction product was diluted with benzine (gasoline), and the reaction residue, after getting rid of the solvent, subjected to vacuum distillation. The yield was 55 per cent of the acid sludge used.

*Example XII.*—100 parts of acid resin obtained in the centrifugal refining of lubricating oil were dissolved in 100 parts of acetone, and the solution commixed with 30 parts of pulverized lime. The heat of reaction thereby liberated rendered all further supply of heat unnecessary. After decanting from the sediment, and distilling off the solvent, the residue was subjected to vacuum steam distillation, the yield amounting to 50 per cent of the acid resin used as starting material.

*Example XIII.*—Into a solution of 20 parts technical MgO in 150 parts of water, heated to boiling, a mixture of 100 parts of acid sludge from sulfuric acid refining of lubricating oil and 100 parts of extract residue from lubricating oil refining with a mixture of liquid SO₂ and benzol was added in portions. The quantity of neutralizing agent was so calculated that it sufficed to neutralize the total acidity of the mixture of wastes. After separation of the solution of inorganic salts which was formed, the neutral organic reaction product was subjected to a fractional vacuum distillation, and the portion boiling between 180° and 340° C. at 20 mm. mercury was recovered. The yield was 70 per cent of the total mixture.

The parts mentioned in the above examples are parts by weight. These examples are given by way of illustration only, and not by way of limitation, and various modifications may be made in the details disclosed therein without departing from the spirit of our invention.

While, as stated hereinabove, any acid sludges from the refining of petroleum oils may be used, the most useful products for most applications now known are obtained only from the sludges derived from uncracked petroleum oils heavier than kerosene. Of these, we generally find acid sludges from lubricating oil refining the most suitable.

What we claim is:

1. As a new product, a viscous mixture of unsaturated hydrocarbons containing substantially 90 per cent carbon and 10 per cent hydrogen and boiling between 150° and 360° C. at 12 mm. Hg absolute pressure, said hydrocarbons having molecular weights from 300 to 1000, having iodine numbers of the order of 20 to 60, being soluble in acetone, aniline, and sulfuric acid, and being capable of nitration and vulcanization.

2. As new compositions of matter, unsaturated viscous hydrocarbon oils boiling between 150° and 360° C. at 12 mm. Hg absolute pressure, and having iodine numbers below 60, said oils being derived from petroleum acid sludge and representing conversion products thereof, said oils being soluble in acetone, aniline and sulfuric acid and being capable both of nitration and vulcanization.

FRITZ ROSTLER.
VILMA MEHNER.